G. M. EATON AND G. H. F. HOLY.
ELECTRIC LOCOMOTIVE.
APPLICATION FILED JULY 30, 1914.
1,306,530.
Patented June 10, 1919.
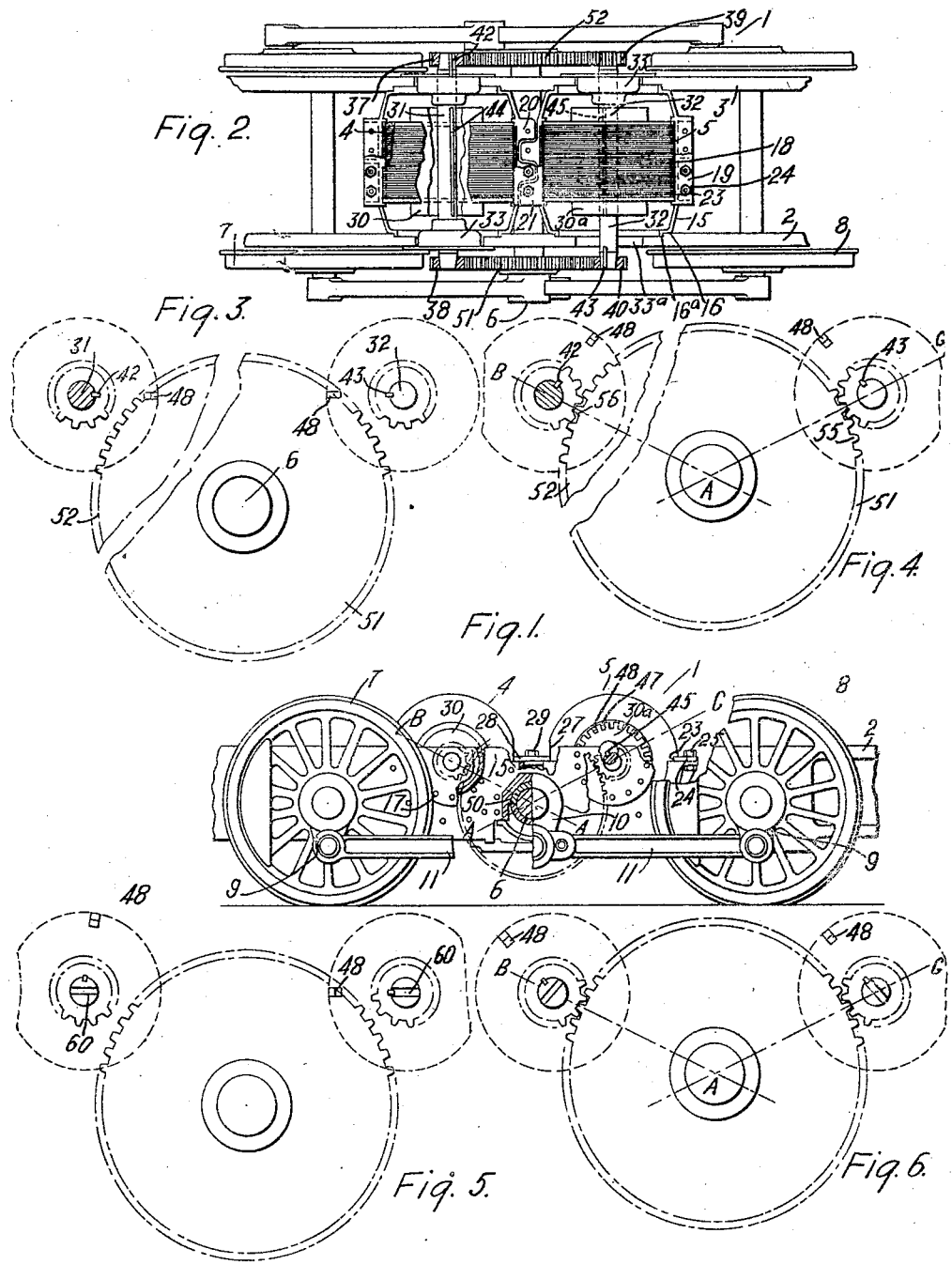
WITNESSES:
Fred A. Lind.
INVENTOR
George M. Eaton
George H. F. Holy.
BY
ATTORNEY

UNITED STATES PATENT OFFICE.

GEORGE M. EATON AND GEORGE H. F. HOLY, OF PITTSBURGH, PENNSYLVANIA, ASSIGNORS TO WESTINGHOUSE ELECTRIC AND MANUFACTURING COMPANY, A CORPORATION OF PENNSYLVANIA.

ELECTRIC LOCOMOTIVE.

1,306,530.   Specification of Letters Patent.   Patented June 10, 1919.

Application filed July 30, 1914. Serial No. 854,020.

*To all whom it may concern:*

Be it known that we, GEORGE M. EATON, a citizen of the United States, and a resident of Pittsburgh, in the county of Allegheny and State of Pennsylvania, and GEORGE H. F. HOLY, a citizen of the United States, and a resident of Pittsburgh, in the county of Allegheny and State of Pennsylvania, have invented a new and useful Improvement in Electric Locomotives, of which the following is a specification.

Our invention relates to electric locomotives, and it has special reference to the running gears of locomotives having trucks propelled by a plurality of polyphase induction motors.

One of the objects of our invention is to provide a locomotive driving gear of the above indicated type which shall be simple, compact and durable in construction, which may be built and assembled with minimum expense and labor, and which shall operate with reliability and effectiveness.

Another object of our invention is to provide an electrically driven truck embodying a plurality of polyphase induction motors that are mechanically geared to a common shaft, and to make adequate provision for insuring that the rotor windings occupy the same relative phase positions, thereby permitting parallel operation of the motors in connection with a single liquid rheostat or other form of adjustable secondary resistance.

More specifically, it is our endeavor to provide an accurate and simple means for checking the phase positions of a plurality of geared polyphase rotors, so that, in reassembling the driving mechanism after having taken it apart for repairs, the proper phase positions of the rotor windings may be readily determined without the exercise of more than ordinary skill.

A still further object of our invention is to provide a driving truck propelled by a pair of polyphase induction motors that are geared to a common countershaft, the latter being associated with the driving wheels by cranks and side rods and the motors being identical, in every detail of construction, although one of them is turned end for end in assembling, whereby the cost of manufacture and assembly is materially lessened.

One other object of our invention is to provide a pair of motors that are connected to a common countershaft at both ends of their respective shafts by means of gears and pinions, only one pinion of each motor shaft being keyed, or otherwise positively attached to, its associated shaft.

According to our invention, therefore, we preferably design the locomotive so that the angle between the center lines of the countershaft and motor shafts shall be an exact multiple of the pitch angle of the countershaft gears, so that, when the windings of the several rotors occupy identical phase positions, corresponding points on the several rotors, such, for instance, as the pinion keys, shall be correspondingly located with respect to the gear teeth which lie upon the center lines between the shaft centers. The proper phase positions of the rotor windings may therefore be accurately determined and checked with facility when the countershaft is raised into its operative position.

Moreover, it has been found, from careful observation, that it is unnecessary to provide keys for driven taper fitted pinions, as, under proper conditions, all of the driving force is transmitted through the taper fits, and the keys only serve to transmit the driving effort in case of a loose pinion which rarely occurs. The key, therefore, is useful only in emergencies and, even then, can not be relied upon except for very limited and light service.

In view of these facts, we employ only a single key for each rotor shaft, which keys are primarily employed for use in checking the phase positions of the windings, and, incidentally, to positively lock at least one pinion to each shaft for purposes of effecting an operative driving connection between each motor and the countershaft, in the event of a loose pinion fit.

Economical manufacturing methods determine that the driving motors shall preferably be identical in construction, which results in one of the motors being turned end for end, whereby the keyed pinions are located on the opposite ends of the different shafts, although this location is otherwise unessential.

Furthermore, the use of only a single keyed pinion for each shaft greatly facilitates the initial assembly of the gearing, for, after having shrunk on the gear rims and keyed two of the pinions, the motors and countershaft may be properly positioned and the remaining pinions assembled on the motor shafts, using the gear teeth as masters. The assembly of such a double end gearing, with all of the pinions keyed, would be a practical impossibility with ordinary shop methods and tools, for the slight errors in mechanical workmanship would be cumulative and would prevent the final coöperative assembly of parts.

Having set forth our invention in a general way, reference may now be had to the accompanying drawing, in which Figure 1 is a view, in side elevation, of an electrically driven truck embodying our invention, certain parts being removed for the sake of clearness; Fig. 2 is a plan view of the structure shown in Fig. 1; Figs. 3 and 4 are enlarged, partially diagrammatic, views of the gearing, shown in different positions in its assembly; and Figs. 5 and 6 are views, respectively similar to Figs. 3 and 4, of a modified form of gearing.

Referring to the drawing, a running gear 1 comprises a plurality of side frames 2 and 3, a pair of polyphase driving motors 4 and 5, a countershaft 6, driving wheels 7 and 8, crank arms 9 and 10, and side rods 11.

The specific construction of the side frames 2 and 3 and the several motors 4 and 5 is set forth in detail in Patent No. 1,241,500, Oct. 2, 1917, filed May 11, 1914, by George M. Eaton and assigned to the Westinghouse Electric & Manufacturing Company and we, therefore, shall attempt to describe only the general arrangement and location of parts.

The motors 4 and 5 are identical in construction in every detail and are so designed that, when one of them is turned end for end and assembled in position the motors are located in close proximity, for a purpose to be hereinafter set forth. The identity in the construction of the motors, and moreover, their specific structural details are unessential to our present invention in its broadest aspect, although preferable from a manufacturing standpoint. As shown, each motor comprises a lower supporting frame 15 of substantially semi-cylindrical form and having semi-circular end projections 16 which are adapted to fit into and be seated upon correspondingly located recesses 16ª provided in the inner sides of the respective side frames 2 and 3. The supporting frame 15 is rigidly bolted, or otherwise secured, to the side frames by bolts 17 and thus constitutes a rigid and permanent cross tie of the frame.

A laminated removable core member 18 rests in a semi-cylindrical seat in the middle portion of the frame 15 and is concentrically related with respect to the circular end projections 16. Inasmuch as no upper half of the motor frame is provided, as is done in usual practice, provisions are necessary for clamping the core member 18 rigidly in position. One side of the supporting frame 15, therefore, is provided with a bracket 19, and at the other side, a plurality of bracket projections 20 and 21 are employed, which projections are so located as to interfit and provide a dove-tail joint between the several motors when they are assembled in their final side-by-side position, in which one of the motors is reversed in position. One side of each core member 18 is provided with a slot 23 which is located slightly above the upper surface of the projecting bracket 19, in order to receive a clamping member 24 which also rests upon the bracket 19 and is secured thereto by bolts 25. The other side of the core 18 is cut away to provide a shoulder 27, also located slightly above the bracket projections 20 and 21.

When the several motors are assembled in side-by-side relation, as shown in the drawing, a clamping member 28 is interposed between the respective core members 18 where it rests upon the shoulders 27 and is clamped to the interfitting bracket projections 20 and 21 by bolts 29.

The several motors 4 and 5 are provided with rotors 30 and 30ª of like construction which are respectively mounted upon shafts 31 and 32 that are independently carried in removable bearing housings 33, the latter being set into circular openings 33ª in the upper edge of the side frames 2 and 3 and being secured thereto in a suitable manner. The openings 33ª are concentrically related to the seats 16ª, whereby concentricity of the rotor with respect to the stator in insured.

The respective ends of the shaft 31 of motor 4 are provided with pinions 37 and 38, while the opposite ends of the shaft 32 of motor 5 are provided with pinions 39 and 40. All of the pinions 37, 38, 39 and 40 have a driven taper fit upon their respective shafts 31 and 32, and pinions 37 and 40 are positively attached thereto by keys 42 and 43, respectively. No keys are provided for the remaining pinions. The shafts 31 and 32 are, of course, provided with suitable key ways to receive the keys 42 and 43 in the usual manner and, moreover, said shafts are also provided with rotor keyways that are in alinement with those already referred to for the purpose of receiving keys 44 and 45, by means of which the respective rotors 30 and 30ª are rigidly secured to their associated shafts. Attention is directed to the fact that the rotor keys 44 and 45 are located in the radial planes of one of the rotor slots 47, which slot is the one from which the winding of the rotor is started and which contains the so-called "phase coils".

Inasmuch as the "phase coil" 48 of each rotor is radially disposed with respect to the rotor key, while the rotor key is in alinement with the pinion key, it is evident that the pinion key, therefore, corresponds in position to the "phase coil" and, therefore, may be utilized as a mark in determining the relative phase positions of the several rotors, when assembled, in a manner to be hereinafter set forth.

The countershaft 6 is disposed below the rotor shafts 31 and 32 and is rotatably mounted in a bearing 50, in such manner that said countershaft 6 may be lowered in position and removed. The countershaft 6 has its respective ends provided with gears 51 and 52 which respectively mesh with the rotor pinions 38 and 40 on one side of the truck 1 and with pinions 37 and 39 on the other side thereof, whereby a double end gearing is provided for transmitting the driving effort of the motors 4 and 5 to a common countershaft 6, from which it is further transmitted to the driving wheels 7 and 8 by the crank arms 9 and 10 and side rods 11, in the ordinary manner.

The countershaft 6 is positioned with respect to the motor shafts 31 and 32 in such manner that the angle B A C between the center of the countershaft 6 and the respective centers of the shafts 31 and 32 is an exact multiple of the pitch angle of the gears 51 and 52, whereby it is possible to so turn the countershaft 6 as to have two of its teeth occupy positions directly upon the center lines AB and AC. Under these conditions, if the rotors 30 and 30ᵃ are correctly positioned so that their respective "phase coils" 48 occupy exact corresponding positions relative to the stator windings, said "phase coils" and, consequently, the keys 42 and 43 will be definitely located with respect to the center line teeth already referred to. This position may be readily determined and serves as a check at all times for properly placing the several rotors in corresponding phase positions for operating said motors concurrently in connection with a single liquid rheostat or other adjustable secondary resistance.

By reason of the duplicate construction of the motors 4 and 5 and the necessity of turning one of them end for end, it is apparent that the key 42 of the pinion 37 will occupy a position, when viewed from the farther side of the truck 1, which corresponds precisely to that of key 43 in the pinion 40, as viewed from the near side of the truck.

Assuming the countershaft 6 to have been removed, the assembly thereof is accomplished as follows: The rotors 30 and 30ᵃ of the motors 4 and 5 are first turned so that the keys 42 and 43 occupy positions, as shown in Fig. 3, from which the respective rotors will turn into their proper phase positions when the countershaft 6 and associated gears 51 and 52 are raised into their final positions. The exact initial position of the keys 42 and 43 will, of course, depend upon the relative size of the coöperating gears and pinions and upon the angle between the several gear centers, and, hence, this initial position must be determined to suit the individual case.

Having raised the countershaft 6 to bring the several gears and pinions into mesh and assuming that certain teeth 55 and 56 of the respective gears 51 and 52 lie upon the center lines AB and AC, respectively, it is a simple matter to check the phase position of the rotors, merely by counting the number of teeth from the respective center line gear teeth to the gear teeth opposite the respective pinion keys.

The identical construction of the several motors 4 and 5, is not only desirable from a stand point of manufacture but the interfitting of the bracket projections 20 and 21 permits the motors to be assembled close together, whereby their respective pinions engage the countershaft gears a material distance above the centers of said gears. Thus, the thrust of the side rod connections is so directed that the teeth of the gearing are not subject to undue and injurious strains.

It should be noted, furthermore, that only a single pinion for each shaft is keyed thereto, which pinion serves to positively associate its respective shaft to the countershaft gear, in case its taper fit becomes loose.

The use of a single keyed pinion with each shaft is, moreover, almost essential in the assembly of the gearing for the reason that, with double-end gearing of the type under consideration, it would be practically impossible, by existing manufacturing methods and tools, to secure sufficiently accurate workmanship to insure that all of the several pinions should be positioned and keyed. The slight inaccuracies of mechanical workmanship which are unavoidable would be cumulative and would render it difficult, if not impossible, to position the last pinion. On the other hand, with a single keyed pinion for each shaft, the assembly is a matter of facility, it being only necessary to first properly position the keyed pinions with respect to the countershaft gears so as to secure the proper phase relation of the rotors, after which, the "back lash" is taken up and the remaining two pinions applied, using the gear teeth as masters.

Reference may now be had to Figs. 5 and 6 which will be referred to in explaining the relationship of parts and relative positions of the "phase coils" and pinion keys in connection with motors which are not necessarily identical in details of construction. Suppose for instance, that, instead of mounting the keyed pinions on the corresponding ends of the armature shafts, which, of course, is desirable from a manufacturing stand point, said pinions are mounted on opposite ends of their respective shafts, or let it be assumed that the motor frames are not duplicates and, therefore, are not reversed in position. It is evident then, that the keyed pinions are located on the same side of the truck and that the pinion keys occupy corresponding positions when the gearing is finally assembled. In certain cases it may be desirable to provide slots 60 in the corresponding ends of the several shafts, which slots should be so located with respect to the "phase coils" and pinion keys that, if a bar be inserted into both slots prior to meshing the gears and pinions, the desired phase relations of the several rotors are insured after the gearing is finally positioned.

On the other hand, the positions of the slots 60 may be chosen with respect to the "phase coils", so that the proper phase position thereof shall be positively checked after the countershaft gears have been raised into mesh with the pinions, by inserting a suitable bar into the slots.

Although we have shown and described our invention as embodying more or less specific structural details and arrangement and location of parts, it is evident that various modifications may be effected therein without departing from the spirit and scope of our invention. We desire, therefore, that only such limitations shall be imposed as are indicated in the appended claims.

We claim as our invention:

1. In a driving mechanism, the combination with a plurality of driving shafts and a driven shaft, of a plurality of pinions fitted to the respective ends of said shafts, a plurality of gear wheels secured to the respective ends of the driven shaft and coöperating with the correspondingly disposed pinions, and a key associated with one end only of each driving shaft, said keys maintaining the driving and the driven shafts in a fixed relation to each other.

2. In a driving mechanism, the combination with a plurality of driving shafts and a driven shaft, of a plurality of pinions fitted to the respective ends of said driving shafts, a plurality of gear wheels secured to the respective ends of the driven shaft and coöperating with the correspondingly disposed pinions, and a single key for each driving shaft, said keys positively preventing relative rotative movement between each driving shaft and any of its associated pinions.

3. In a driving mechanism, the combination with a pair of driving shafts having tapered ends, a driven shaft, gear wheels on the ends of said driven shaft, and pinions having driven-taper fits to the ends of said driving shafts and meshing with the correspondingly located gear wheels, of a single key associated with each shaft for positively locking one of the pinions thereto.

In testimony whereof, we have hereunto subscribed our names this 22nd day of July, 1914.

GEORGE M. EATON.
GEORGE H. F. HOLY.

Witnesses:
G. R. IRWIN,
B. B. HINES.

Copies of this patent may be obtained for five cents each, by addressing the "Commissioner of Patents, Washington, D. C."